(12) United States Patent
Chen

(10) Patent No.: US 7,611,074 B2
(45) Date of Patent: Nov. 3, 2009

(54) WATER FLOW VOLUME DISPLAY DEVICE FOR WATERING NOZZLE

(76) Inventor: Yann-Shoou Chen, 5-1F, No.503, Sec. 3, Kuangfu Rd., Hsinchu City (TW) 300

( * ) Notice: Subject to any disclaimer, the term of this patent is extended or adjusted under 35 U.S.C. 154(b) by 347 days.

(21) Appl. No.: 11/640,187

(22) Filed: Dec. 18, 2006

(65) Prior Publication Data

US 2008/0142615 A1    Jun. 19, 2008

(51) Int. Cl.
- *B67D 5/08* (2006.01)
- *B67D 5/38* (2006.01)
- *B05B 9/01* (2006.01)
- *B05B 1/30* (2006.01)
- *G01F 1/20* (2006.01)

(52) U.S. Cl. ............. 239/74; 239/71; 239/525; 239/526; 239/583; 73/861.33

(58) Field of Classification Search .......... 239/71, 239/74, 525, 526, 583; 73/861, 861.32, 861.33
See application file for complete search history.

(56) References Cited

U.S. PATENT DOCUMENTS

| | | | | |
|---|---|---|---|---|
| 4,700,579 A | * | 10/1987 | Hall | 73/861.78 |
| 5,540,102 A | * | 7/1996 | Kindrick | 73/861 |
| 6,085,586 A | * | 7/2000 | Arvidson et al. | 73/201 |
| 7,257,999 B2 | * | 8/2007 | Goldfarb | 73/149 |

\* cited by examiner

*Primary Examiner*—Len Tran
*Assistant Examiner*—Ryan Reis

(57) ABSTRACT

A watering nozzle includes a water volume detection unit received in the barrel of the watering nozzle and the water volume detection unit has two stationary members and a rotatable member which is rotatably connected between the two stationary members. The rotatable member has a magnet connected thereto which is rotated with the rotatable member when water passes through the rotatable member. A display unit is connected to the barrel and has a circuit board and a display member which is electrically connected to the circuit board. The times of revolution are detected by a magnetic spring switch on the circuit board and transferred into digits on the display member to show the volume of water that flows through the rotatable member and the nozzle unit connected to the barrel.

4 Claims, 5 Drawing Sheets

US 7,611,074 B2

WATER FLOW VOLUME DISPLAY DEVICE FOR WATERING NOZZLE

FIELD OF THE INVENTION

The present invention relates to a water flow volume display device which is connected on a top of the water nozzle so as to display the water volume flowing out from the watering nozzle.

BACKGROUND OF THE INVENTION

A conventional watering nozzle 80 is shown in FIGS. 4 and 5, and generally includes a barrel which has a first passage 812 defined therein and a handle 81 is connected to the barrel and a second passage 811 is defined through the handle 81. The first and second passages 812, 811 are in communication with each other. An operation rod 82 is movably inserted into the first passage 812 from a rear end of the barrel and a spring 813 is mounted onto the operation rod 82. A collar 831 is received in the first passage 812 and has a central hole in which an insertion 821 on an end of the operation rod 82 is removably inserted. A nozzle member 83 is connected to the front end of the barrel and a rotatable member 84 is rotatably mounted onto the nozzle member 83. An operation bar 85 is pivotably connected to the handle 81 and has one end pivotably connected to the operation rod 82. When operating the operation bar 85, the operation rod 82 is pulled and the insertion 821 is removed from the central hole of the collar 831, so that water flows through the from the second passage 811, enters into the first passage 812, flows through the central hole of the collar 831 and flows out from a through hole in the nozzle member 83. The user may rotate the rotatable member 84 to adjust the size of the gap between the opening 841 of the rotatable member 84 and the distal end of the nozzle member 83 to adjust the pattern of the water beam. When releasing the operation bar 85, the operation rod 82 is moved to insert the insertion 821 in the central hole of the collar 831 to seal the central hole so that the water cannot flow out from the opening 841 of the rotatable member 84. However, the water volume that released from the opening 841 of the rotatable member 84 is unknown and the water volume is crucial for some situations such when watering specific plants like orchids.

The present invention intends to provide a watering nozzle with a water volume display device which displays the volume of water that goes out from the watering nozzle.

SUMMARY OF THE INVENTION

The present invention relates to a watering nozzle that comprises a barrel and a handle connected to the barrel. An operation device includes a trigger and a switch, wherein the switch is connected to the handle and the trigger is pivotably connected to the barrel. The trigger can be pivotable to touch the switch and to operate a valve unit to allow water to enter into the watering nozzle. A nozzle unit is connected to a first end of the barrel and a water volume detection unit is received in the barrel. The water volume detection unit has a rotatable member which has a magnet connected thereto. A display unit is connected to the barrel and has a circuit board and a display member which is electrically connected to the circuit board. A battery unit is connected to a second end of the barrel and is electrically connected to the switch. A magnetic spring switch is connected to the circuit board and detects a number of revolution of the rotatable member by detecting times that the magnet passes by the magnetic spring switch. The times of revolution of the rotatable member are transferred into digits displayed on the display member.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
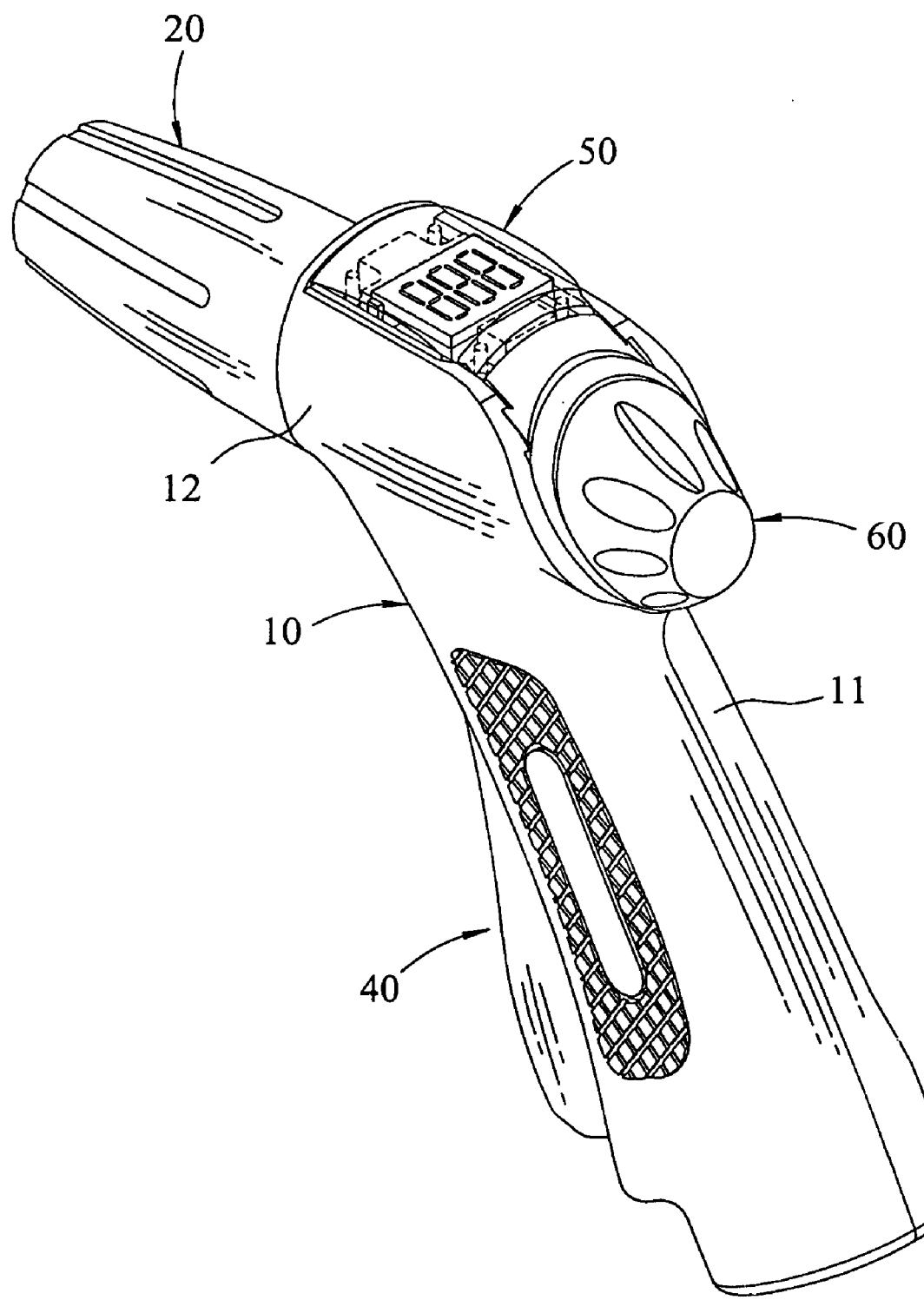
FIG. 1 is a perspective view to show the watering nozzle of the present invention.
Figure 2:
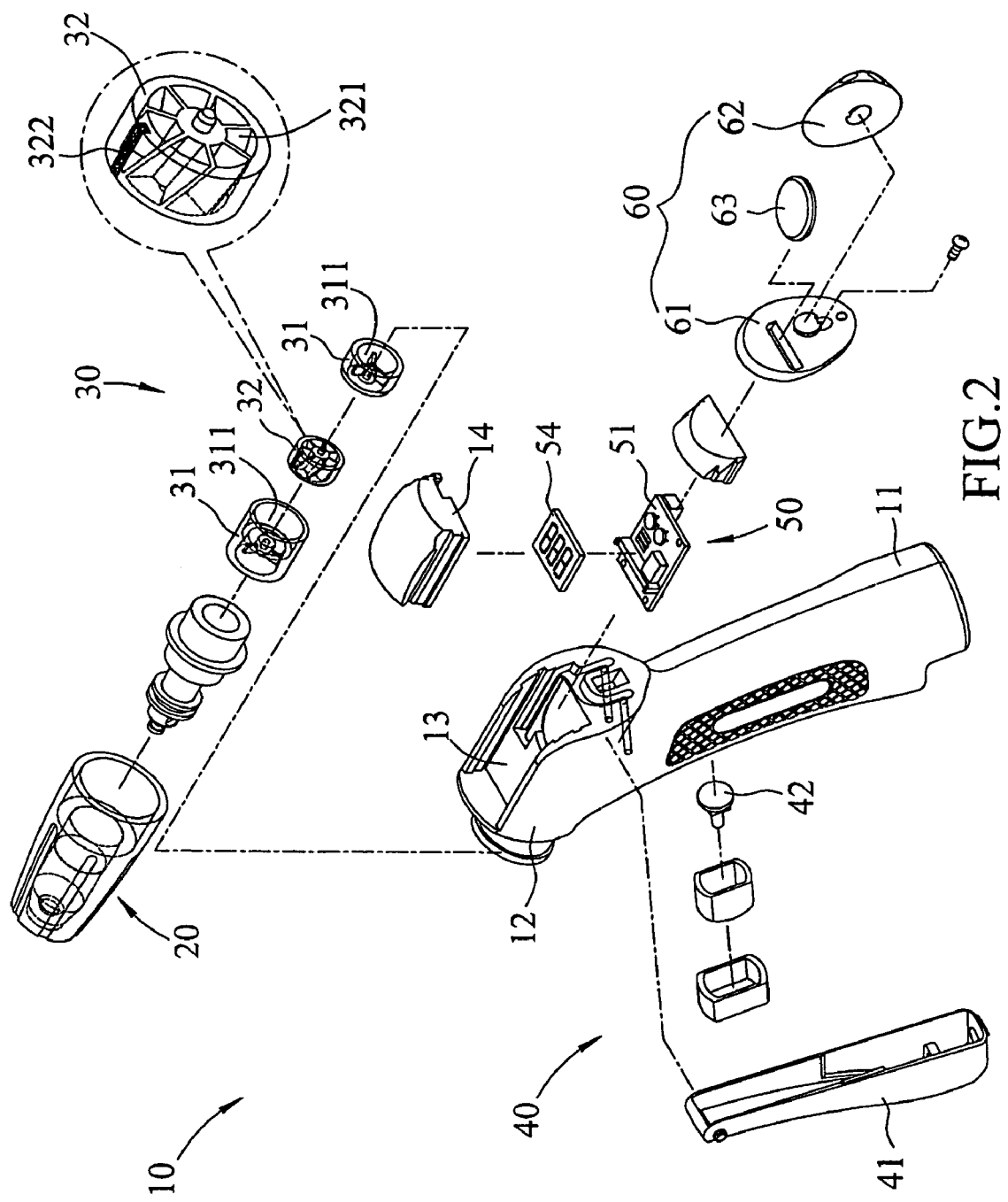
FIG. 2 is an exploded view to show the watering nozzle of the present invention.
Figure 3:
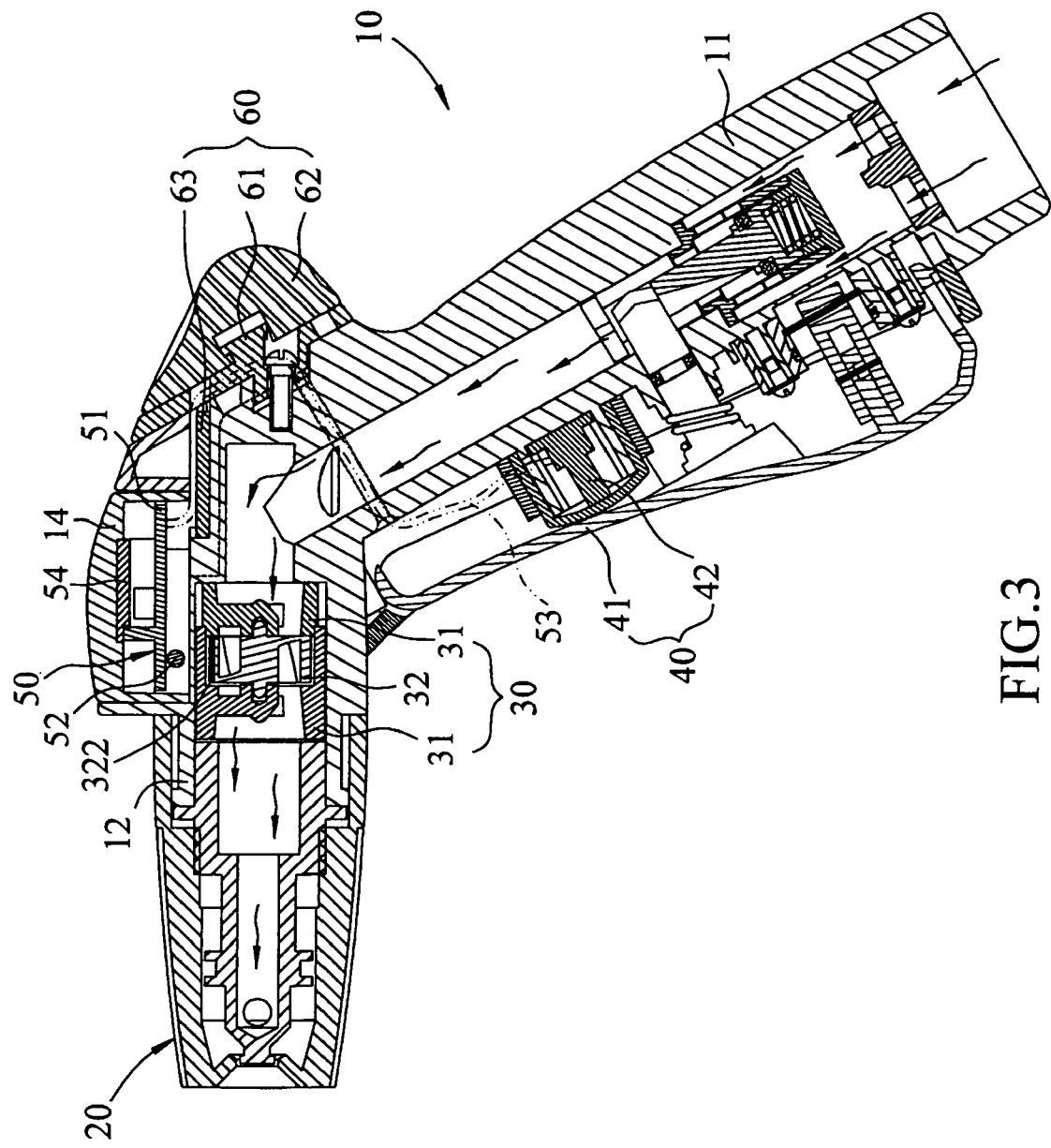
FIG. 3 is a cross sectional view of the watering nozzle of the present invention.
Figure 4:
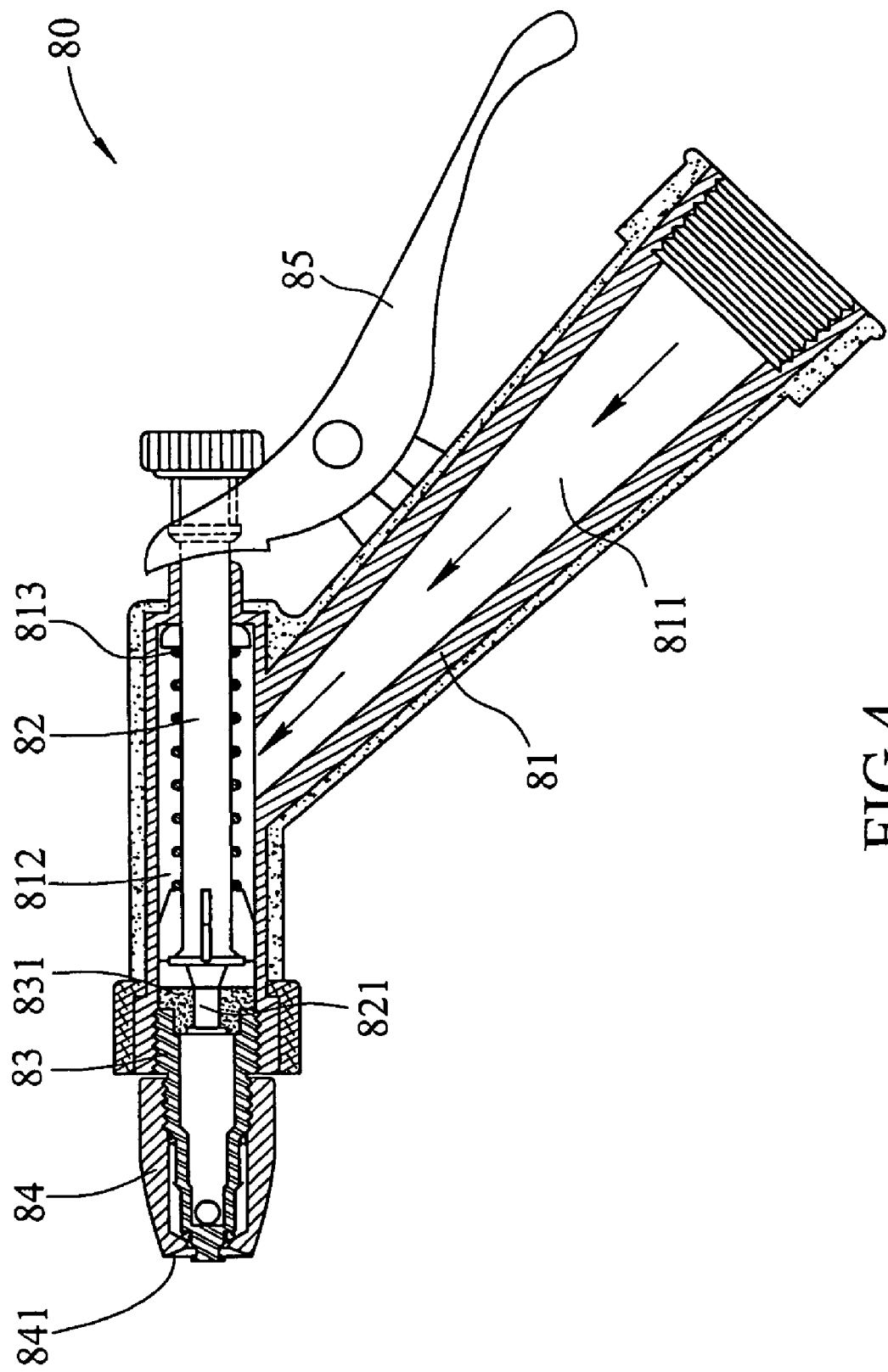
FIG. 4 is a cross sectional view of a conventional the watering nozzle.
Figure 5:
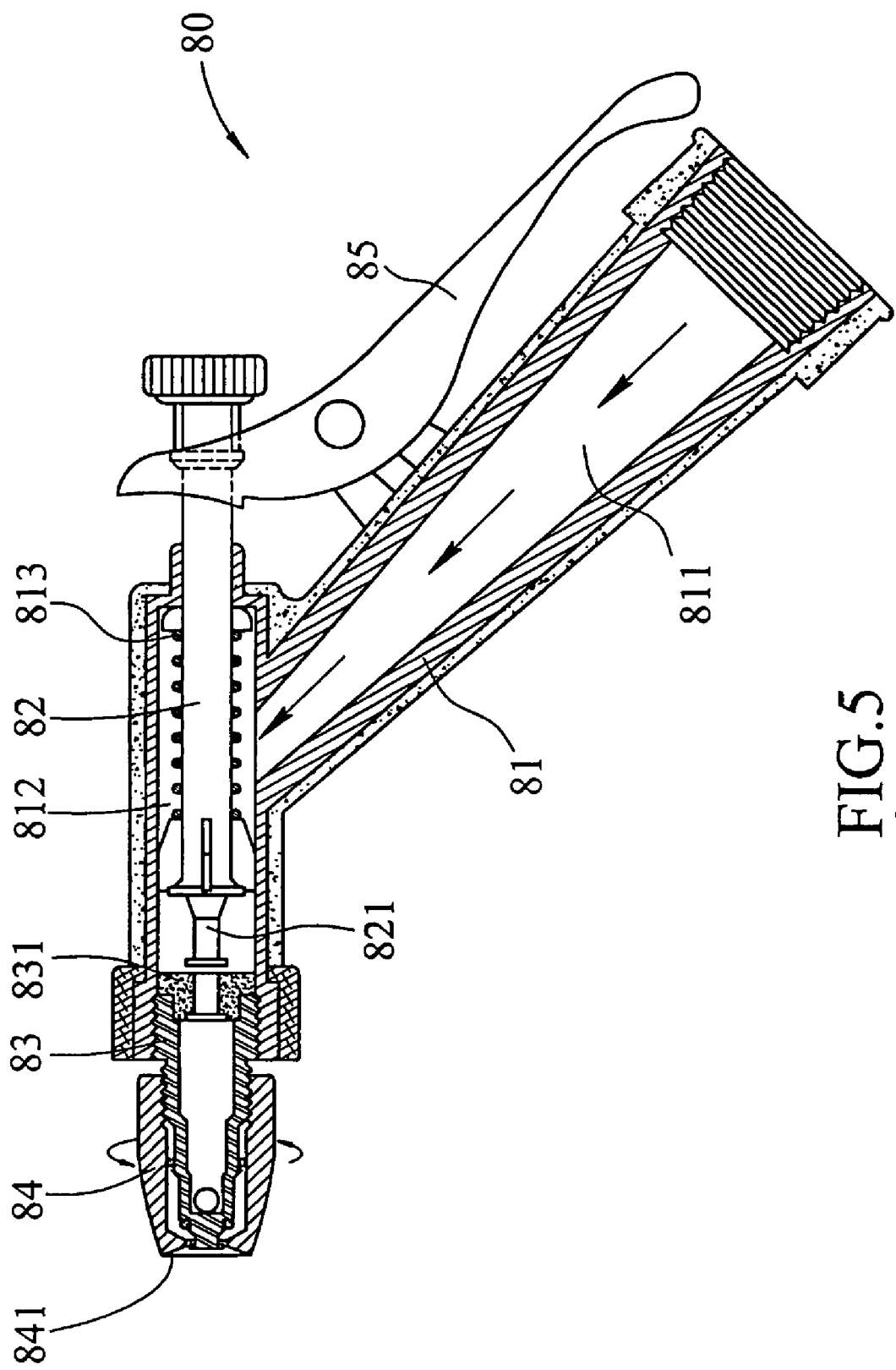
FIG. 5 is a cross sectional view to show that the operation rod of the conventional the watering nozzle is pulled by operating the operation bar.

Referring to FIGS. 1 to 3, the watering nozzle 10 of the present invention comprises a barrel 12 and a handle 11 which connected to the barrel 12. A first passage is defined in the handle 11 and the barrel 12 has a second passage which communicates with the first passage. The handle 11 can be connected with a hose to introduce water into the first passage.

A nozzle unit 20 is connected to a first end of the barrel 12 and includes a nozzle member and a rotatable member which is rotatable relative to the nozzle member so as to adjust a gap between an opening of the rotatable member and the nozzle member. The nozzle unit 20 is a well known device and will not be described hereinafter. A water volume detection unit 30 is received the second passage in the barrel 12 and includes two stationary members 31 and a rotatable member 32 which is rotatably connected between the two stationary members 31. Each of the two stationary members 31 has a through passage 311 defined therethrough and the rotatable member 32 has a magnet 322 connected thereto. The rotatable member 32 includes a hollow cylindrical case which includes two open ends, a central shaft is located axially and centrally in the hollow cylindrical case and a plurality of inclined blades 321 are directly connected radially between the shaft and an inner periphery of the hollow cylindrical case of the rotatable member 32. The magnet 322 is connected to an outer periphery of the hollow cylindrical case so as not to be in contact with water flow during use. Two protrusions extend from two ends of the shaft of the rotatable member 32 and each of the two stationary members 31 has a recess so that the two protrusions are rotatably engaged with the two respective recesses of the two stationary members 31. When water flows through the rotatable member 32, the water hits the inclined blades 321 and rotates the rotatable member 32.

An operation device 40 is connected to the watering nozzle 10 and has a trigger 41 and a switch 42. The switch 42 is connected to the handle 11 and the trigger 41 is pivotably connected to the barrel 12. The trigger 41 is pivotable to touch the switch 42 and to operate a valve unit to allow water to enter into the first passage.

A display unit 50 is received in a recessed area 13 defined in a top of the barrel 12 and includes a circuit board 51 and a display member 54 which is electrically connected to the circuit board 51 and has a plurality of Light Crystal Diodes. A transparent cover 14 is engaged with the recessed area 13 so that the user can see the display member 54 via the transparent cover 14.

A battery unit 60 is connected to a second end of the barrel 12 and has a battery 63 which is electrically connected to the switch 42 and the switch 42 by a wire 53. The battery unit 60 includes two positioning members 61, 62 and the battery 63 is located between the two positioning members 61, 62. The battery 63 extends through a slot defined in positioning member 61. A magnetic spring switch 52 is connected to the circuit board 51 and located above the rotatable member 32.

When the user pulls the trigger 41, the valve unit is activated to introduce water into the first passage of the handle 11. The switch 42 is also activated when the trigger 41 is pulled, the number of revolution of the rotatable member 32 is detected by the times that the magnet 322 passes by the magnetic spring switch 52. The times of revolution of the rotatable member 32 are transferred digits displayed on the display member 54. Each revolution of the rotatable member 32 allows a certain amount of the water to pass through the rotatable member 32 so that the times of the revolutions of the rotatable member 32 can be transferred into digits which represents volume of water passing through the rotatable member 32 and the nozzle unit 20.

When the user releases the trigger 41, the valve unit is moved to its initial position by the spring of the valve unit so that water cannot enter into the first and second passages. In the same time, the switch 42 is not in contact with the trigger 41 so that the display unit 50 displays its initial status.

While we have shown and described the embodiment in accordance with the present invention, it should be clear to those skilled in the art that further embodiments may be made without departing from the scope of the present invention.

What is claimed is:

1. A watering nozzle comprising:

a barrel and a handle which is connected to the barrel, a first passage defined in the handle and the barrel having a second passage which communicates with the first passage, an operation device connected to the watering nozzle and having a trigger and a switch, the trigger being pivotable to touch the switch and to operate a valve unit to be adapted to allow water to enter into the first passage;

a nozzle unit connected to a first end of the barrel and a water volume detection unit received in the second passage in the barrel, the water volume detection unit having two stationary members and a rotatable member which is rotatably connected between the two stationary members, each of the two stationary members having a through passage defined therethrough and the rotatable member having a magnet connected thereto, the rotatable member including a hollow cylindrical case which includes two open ends, a central shaft located axially and centrally in the hollow cylindrical case and a plurality of inclined blades directly connected radially between the shaft and an inner periphery of the hollow cylindrical case of the rotatable member, the magnet connected to an outer periphery of the hollow cylindrical case and being not in contact with water flow, two protrusions extending from two ends of the shaft of the rotatable member and each of the two stationary members having a recess, the two protrusions rotatably engaged with the two respective recesses of the two stationary members;

a display unit connected to the barrel and having a circuit board and a display member which is electrically connected to the circuit board, and a battery unit connected to a second end of the barrel and having a battery which is electrically connected to the switch, a magnetic spring switch connected to the circuit board and detecting a number of revolution of the rotatable member by detecting times that the magnet passes by the magnetic spring switch, the times of revolution of the rotatable member being transferred into digits displayed on the display member.

2. The watering nozzle as claimed in claim 1, wherein the battery unit includes two positioning members and the battery is located between the two positioning members, the battery extends through a slot defined in one of the two positioning members.

3. The watering nozzle as claimed in claim 1, wherein a recessed area is defined in the barrel and the display unit is received in the recessed area.

4. The watering nozzle as claimed in claim 3, wherein a transparent cover is engaged with the recessed area.

* * * * *